(12) United States Patent
Rao et al.

(10) Patent No.: US 10,148,698 B2
(45) Date of Patent: Dec. 4, 2018

(54) SELECTIVE ENFORCEMENT OF EVENT RECORD PURGING IN A HIGH VOLUME LOG SYSTEM

(71) Applicant: Fortinet, Inc., Sunnyvale, CA (US)

(72) Inventors: Santosh Rao, Fremont, CA (US); Partha Bhattacharya, Cupertino, CA (US)

(73) Assignee: Fortinet, Inc., Sunnyvale, CA (US)

( * ) Notice: Subject to any disclaimer, the term of this patent is extended or adjusted under 35 U.S.C. 154(b) by 111 days.

(21) Appl. No.: 15/283,290

(22) Filed: Sep. 30, 2016

(65) Prior Publication Data

US 2018/0097844 A1    Apr. 5, 2018

(51) Int. Cl.
*H04L 29/06*  (2006.01)
*G06F 17/30*  (2006.01)
*G06F 21/50*  (2013.01)

(52) U.S. Cl.
CPC ........ *H04L 63/20* (2013.01); *G06F 17/30864* (2013.01); *G06F 21/50* (2013.01); *H04L 63/1425* (2013.01); *G06F 2221/2101* (2013.01)

(58) Field of Classification Search
CPC . H04L 63/14; H04L 63/1408; H04L 63/1416; H04L 63/1425; H04L 63/20; G06F 21/50; G06F 21/55; G06F 21/552; G06F 21/554
See application file for complete search history.

(56) References Cited

U.S. PATENT DOCUMENTS 9,215,151 B1 * 12/2015 De Rosa ............... H04L 43/024
9,246,828 B1 *  1/2016 Tagore .................... H04L 47/25
9,626,275 B1 *  4/2017 Hitchcock ........... G06F 11/3006

* cited by examiner

*Primary Examiner* — Edward Zee
(74) *Attorney, Agent, or Firm* — Law Office of Dorian Cartwright; Dorian Cartwright

(57) ABSTRACT

Event record purging is selectively enforced in a high volume log system. A plurality of data retention policies is received for one or more data types. Each data retention policy can describe a retention duration for enforcement of different data types with respect to online retention and offline retention. Only online compressed file from a period of time potentially containing event records with an expiring retention duration are uncompressed. Other files are ignored to save I/O bandwidth for supporting queries of event records. Some implementations search records using the index as well.

13 Claims, 7 Drawing Sheets

SELECTIVE ENFORCEMENT OF EVENT RECORD PURGING IN A HIGH VOLUME LOG SYSTEM

FIELD OF THE INVENTION

The invention relates generally to computer networking, and more specifically, to enforce data retention policies with selective data purges during an enforcement period.

BACKGROUND

The field of security information and event management (SIEM) is generally concerned with collecting data from networks and networked devices that reflects network activity and/or operation of the devices, and analyzing the data to enhance security. For example, the data can be analyzed to identify an attack on the network or a networked device and determine which user or machine is responsible. If the attack is ongoing, a countermeasure can be performed to thwart the attack or mitigate the damage caused by the attack. The data that is collected usually originates in a message (such as an event, alert, or alarm) or an entry in a log file, which is generated by a networked device. Exemplary networked devices include firewalls, intrusion detection systems, and servers.

One problem with conventional SIEM services concerns the I/O bandwidth consumed by continually checking individual event records for purging. For example, event records may be checked periodically against each separate retention policy because each policy can delineate varying retention periods for event records. Performance and health event records, for instance, can be retained for just 30 days in contrast to more critical server access and authentication records that can be retained for 1 to 5 years.

At the same time, I/O bandwidth can be strained by queries of event records being serviced by the same log system.

Therefore, what is needed is a robust log system for that selectively purges events with a single pass defined by a union of retention policies.

SUMMARY

These shortcomings are addressed by the present disclosure of methods, computer program products, and systems for enforcing data retention policies with selective data purges during an enforcement period.

In one embodiment, a plurality of data retention policies is received for one or more data types. Each data retention policy can describe a retention duration for enforcement of different data types with respect to online retention and offline retention. Event records are received and stored as compressed files containing a plurality of event records occurring during a time period in a time container.

In another embodiment, an index layer is built for each event records in the compressed file based on a data retention policy associated with a data type of the event. Using the index, logged event records are selectively purged from the time containers. To do so, only online compressed file from a period of time potentially containing event records with an expiring retention duration are uncompressed. Other files are ignored to save I/O bandwidth for supporting queries of event records. Some implementations search records using the index as well.

In another embodiment, expired event records are written to an offline compressed file for a period of time in a time container, along with an index layer generated for the offline compressed file for each period of time based on a definition of the specific retention policy for offline retention. Non-expired event records are written to a new online compressed file, along with an index layer generated for the online compressed file for each period of time based on the definition of the specific retention policy for online retention. Identified event records in an offline compressed file can be purged while unexpired event records are written to a new offline compressed file of multiple event records.

Advantageously, I/O bandwidth of a log management system is efficiently preserved in order to purge event records and query event records.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The present invention provides methods, computer program products, and systems for enforcing data retention policies with selective data purges during an enforcement period. For example, SIEM logging rates are adjusted in real-time in response to a specific location of a network outage or security intrusion. One of ordinary skill in the art will recognize that many other scenarios are possible, as discussed in more detail below.

Figure 1:
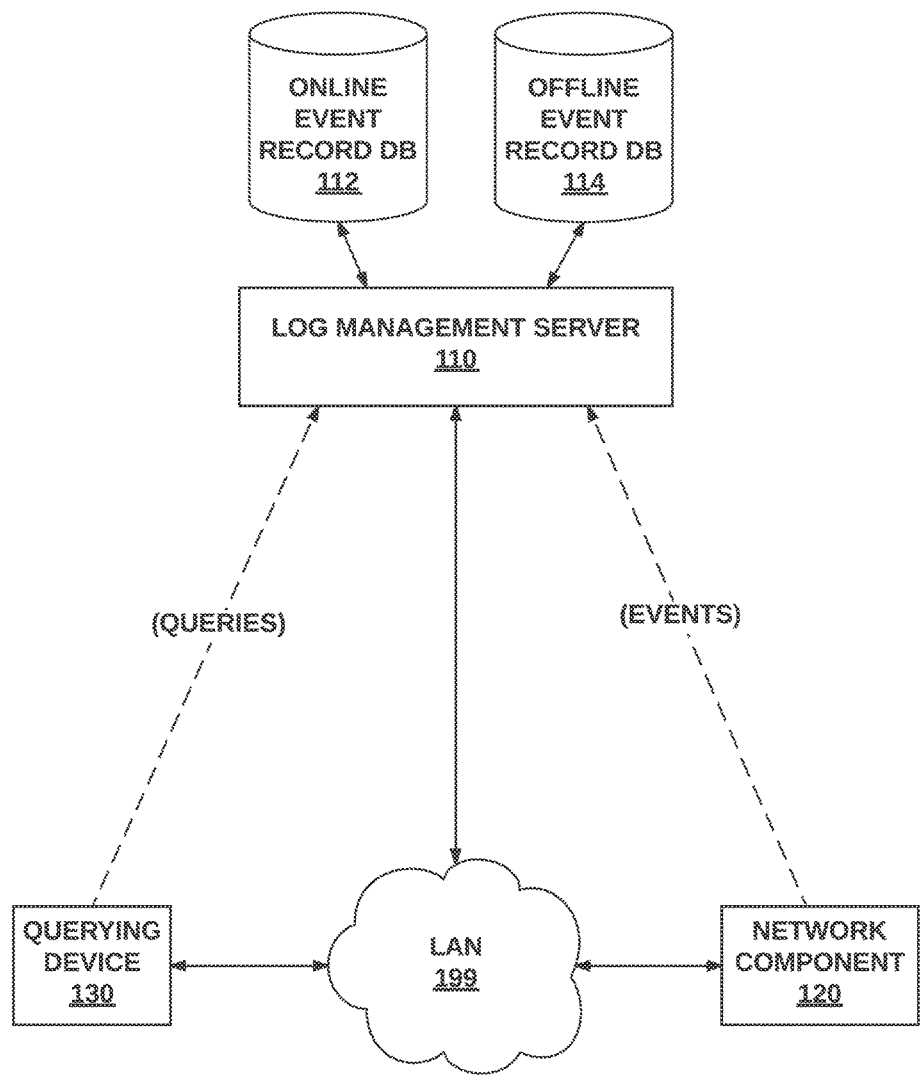
FIG. 1 is a high-level block diagram illustrating a system to enforce data retention policies with selective data purges during an enforcement period, according to one embodiment.
Figure 2:
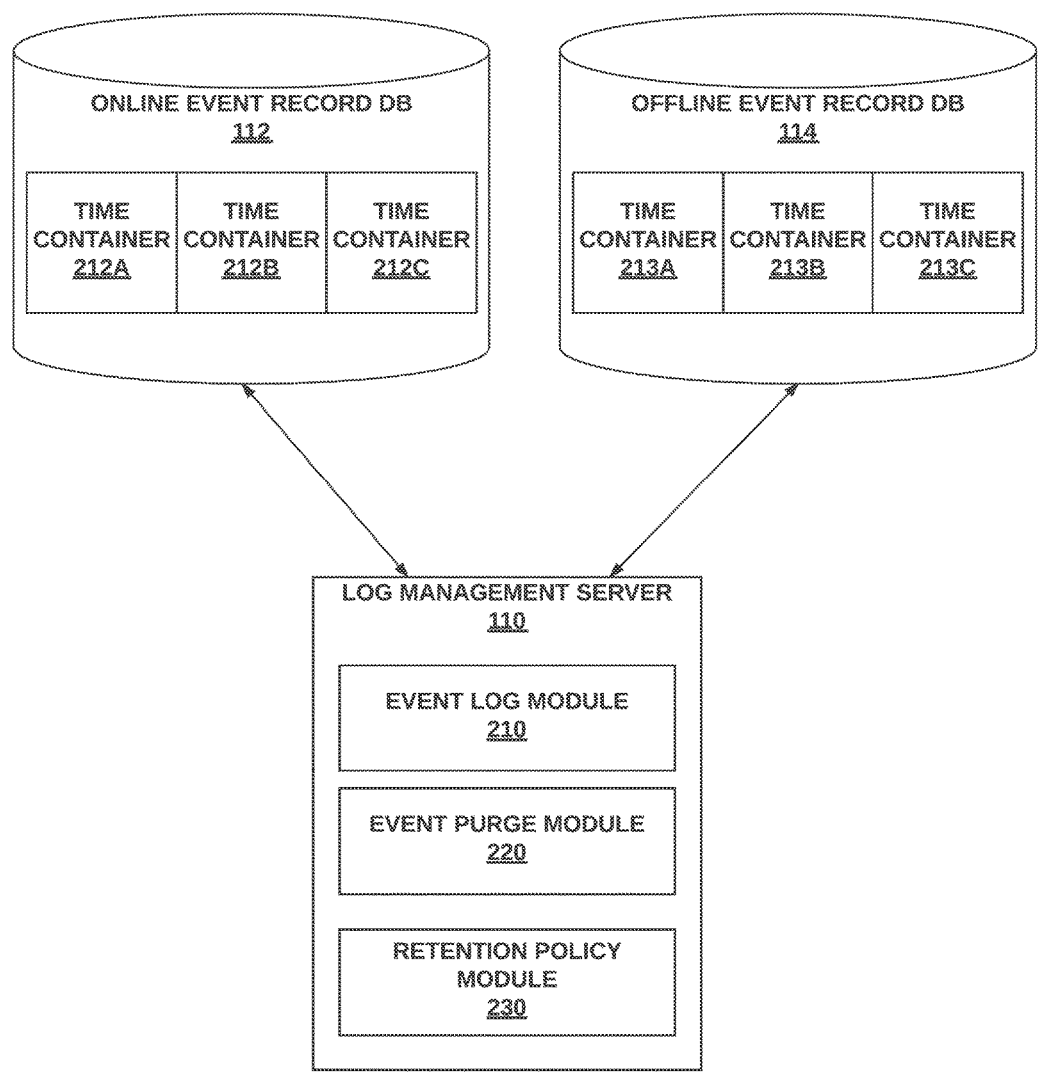
FIG. 2 is a more detailed block diagram illustrating internal components of a log management server from the system of FIG. 1, according to some embodiments.
Figure 3:
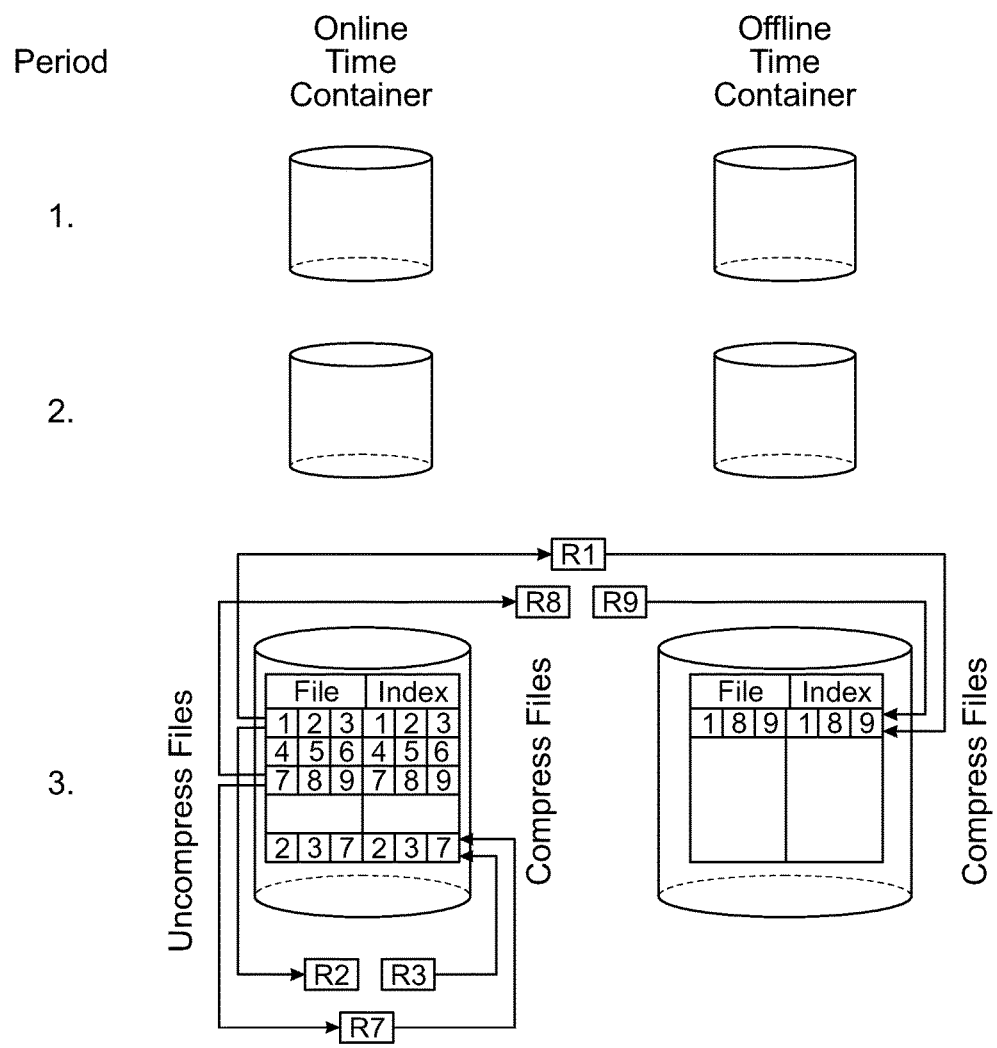
FIG. 3 is a schematic diagram illustrating files being selectively purged from online storage and moved to offline storage, according to an embodiment.

Systems to Enforce Data Retention Policies with Selective Purges (FIGS. 1-3)

FIG. 1 is a high-level block diagram illustrating a system 100 to enforce data retention policies with selective data purges during an enforcement period, according to one embodiment. The system 100 comprises a log management server 110, network devices 120A-B, and querying device 130.

In a preferred embodiment, the log management server 110, the network devices 120A-B, and the querying device 130 are shown as coupled to the LAN 199. In some case, coupling to the LAN 199 can be indirect if the network devices 120A-B or the querying device reaches the LAN 199 through an access point. The log management server 110 is also coupled to the WAN 199, preferably through a wired connection. Additional network components can also be part of the system 100, such as firewalls, virus scanners, routers, switches, application servers, databases, and the like.

The log management server 110 generally analyzes and manages storage of event records received from network devices 120A-B. Retention policies define how long event records are retained in online storage and offline storage. After a first time period, the log management server 110 selectively purges event records from online storage in a manner that conserves I/O transactions for also handling incoming queries. In some embodiments, purged online records are moved to offline storage to conserve resources. After another second time period, event records are selectively purged from offline storage. Retention policies can describe other aspects of event logging, such as EPS (events per second) which limits a rate at which event records are submitted to the log management server 110 from various network devices.

In some embodiments, retention policies describe how to handle different types of data. For example, performance and health metrics that are high volume and not critical are kept for 30 days, firewall/ router/ switcher traffic data that is high volume and not critical is kept for 30 days, server access and authentication logs that are moderate volume and critical are kept for 1 to 5 years, configuration change that are moderate volume and mission critical are kept for 1 to 5 years. Retention policies can be specific to a customer, a reporting device or group, an event type of group, a host (source of destination) device or group, a TCP/UDP port or range, a process/application name or group, and a user or group/domain. In other embodiments, feedback or conditions can affect retention policies. For instance, amount of actual data accumulated for a data type, amount of actual data accumulated for all data types, amount of remaining storage, amount of query I/O bandwidth being used, EPS, and other factors can modify or event dictate execution of retention policies.

An online event database 112 and an offline event database 114 store event records under direction of the log management server 110. The online event database 112 in some cases shares I/O transaction bandwidth with queries made on event records. The databases 112,114 can be tables, relational databases, CSV (comma separated value) lists, or the like.

One implementation includes the online event database 112 within the log management server 110, or connects directly thereto, for the fastest response time to queries, while the offline event database 114 is remotely located. Another implementation includes the online event database 112 on the same LAN as network devices 102A-B, while the offline event database 114 is a third-party storage service located external to the LAN. One of ordinary skill in the art will recognize that various other configurations are possible.

In one embodiment, collector nodes (not shown) are geographically dispersed data collectors that are located proximate to the underlying network devices 120A-B. Event records are first sent to collector nodes for aggregation and pre-processing before submission to the log management server. In one embodiment, each entity subscribing to the log management server 110 has a collector node located locally on a LAN.

The network devices 120A-B can be, for example, a gateway device, a firewall, an access point, a switch a router, a hub, a repeater, a server, a controller, a wireless station, or any other device on the LAN 199 or other type of network. The network devices 120A-B can be implemented in a personal computer, a laptop computer, a tablet computer, a smart phone, a mobile computing device, a server, a cloud-based device, a virtual device, an Internet appliance, or any of the computing devices described herein (see e.g., FIG. 7). No client configuration or download is needed for this particular technique, although other aspects of log management may require downloads to the network devices 120A-B. For instance, an operating system patch or separate application can detect error events through intercepting messages, and collect data for sending to the log management server 110.

In some embodiments, the log management server 110 is a subscription operated by a third party from the network devices 120A-B administered according to SLA (service level agreement) terms. The log management system 110 can be a FortiSIEM device by Fortinet, Inc. of Sunnyvale, CA, in one embodiment. Additional example embodiments of the log management system are discussed below in relation to FIG. 2.

Figure 7:
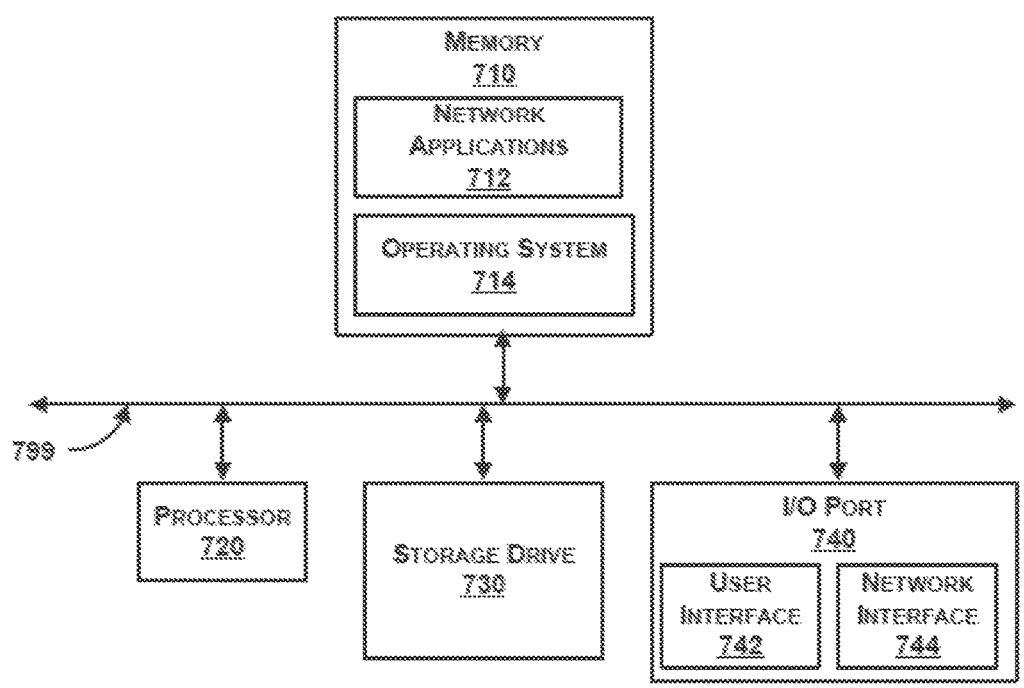
FIG. 7 is a block diagram illustrating an example computing device, according to one embodiment.

The network components of the system 100 can implemented in any of the computing devices discussed herein, for example, a personal computer, a laptop computer, a tablet computer, a smart phone, a mobile computing device, a server, a cloud-based device, a virtual device, an Internet appliance, or any of the computing devices described herein, using hardware and/or software (see e.g., FIG. 7).

FIG. 2 is a more detailed block diagram illustrating the log management server 110 of the system 100, according to one embodiment. The log management server 110 is coupled to the online event records DB 112 and the offline event records DB 114, either internally or externally. The log management server 110 comprises an event log module 210, an event purge module 220, and a retention policy module 230. The components can be implemented in hardware, software, or a combination of both.

The event log module 210 manages incoming events or event records from the network devices 120A-B. In implementations receiving events, a corresponding event record is generated from event data. Event records can be sent to the online event database 112 as is, along with an indication of a corresponding retention policy, as determined by a type of event. In other embodiments, event records are aggregated into a single file and compressed. An index can be associated with the file to provide characteristics of the event records within, such as which retention policy applies or duration of storage. In still other embodiments, event records are analyzed prior to storage, resulting in alerts or remediation actions (e.g., in the event of a security attack).

The retention policy module 230 configures and stores retention policies. A user can log on to an account through a user interface and enter different parameters. Users can subscribe to a plan that preserves event records online for a certain duration and/or offline for a certain duration.

The event purge module 220 looks up files in the databases 112,114 for a specific one of the time containers 212A-C,213A-C. A union of policies identifies common search criteria that covers each policy. For example, if the durations for online storage include 10 days, 15 days and 30 days, the index is searched for 10 days as a union of 10 days or 15 days or 30 days. Matching files are uncompressed, expired files being moved to a time container in offline storage, and unexpired files being written to a new file and returned to a time container in the online storage. As shown in FIG. 3, an online time container includes Files 1 through 9, as three compressed files. File 1 and file 3 are identified through a policy union as having relevant event records. Record 1 from file 1 and records 8 and 9 from file 3 are moved to a file 1 in offline storage, as expired files. At the same time, unexpired files 2 and 3 from file 1 and file 7 from file 3 are written into a file 4.

Figure 4:
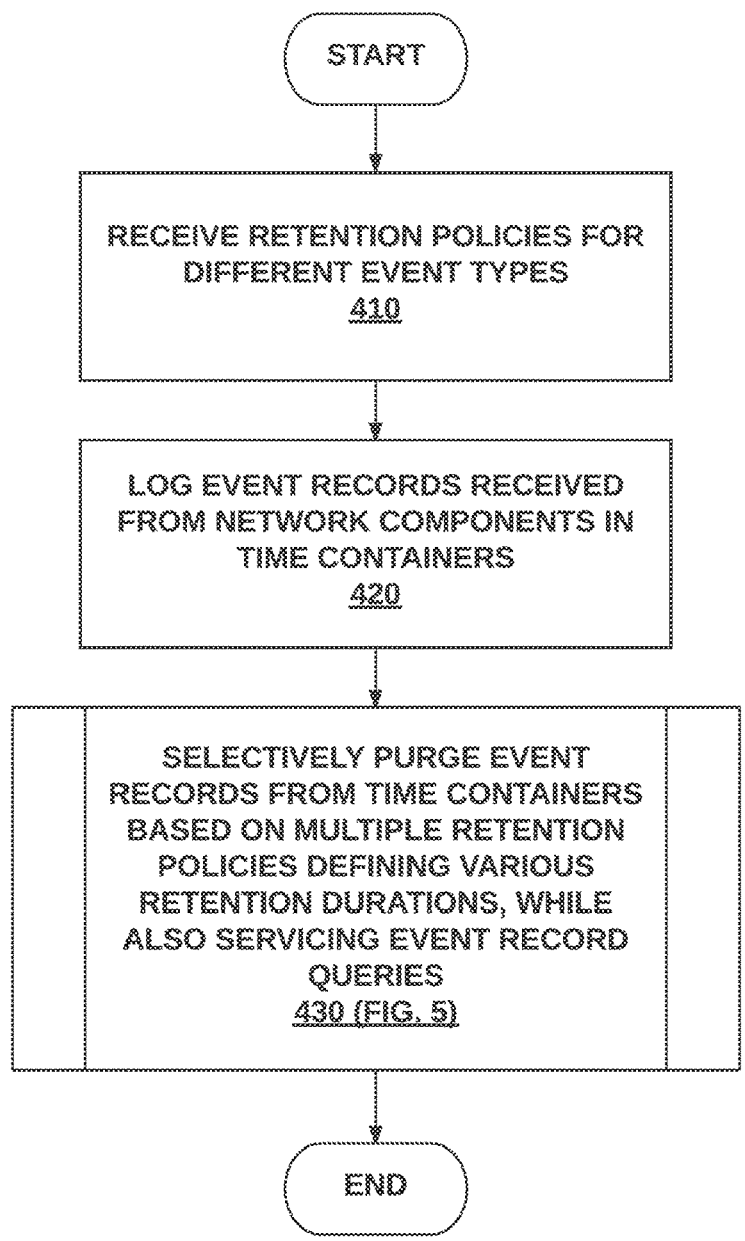
FIG. 4 is a high-level flow diagram illustrating a method for enforcing data retention policies and servicing search queries for event records in a high volume log system with limited I/O bandwidth, according to one embodiment.
Figure 5:
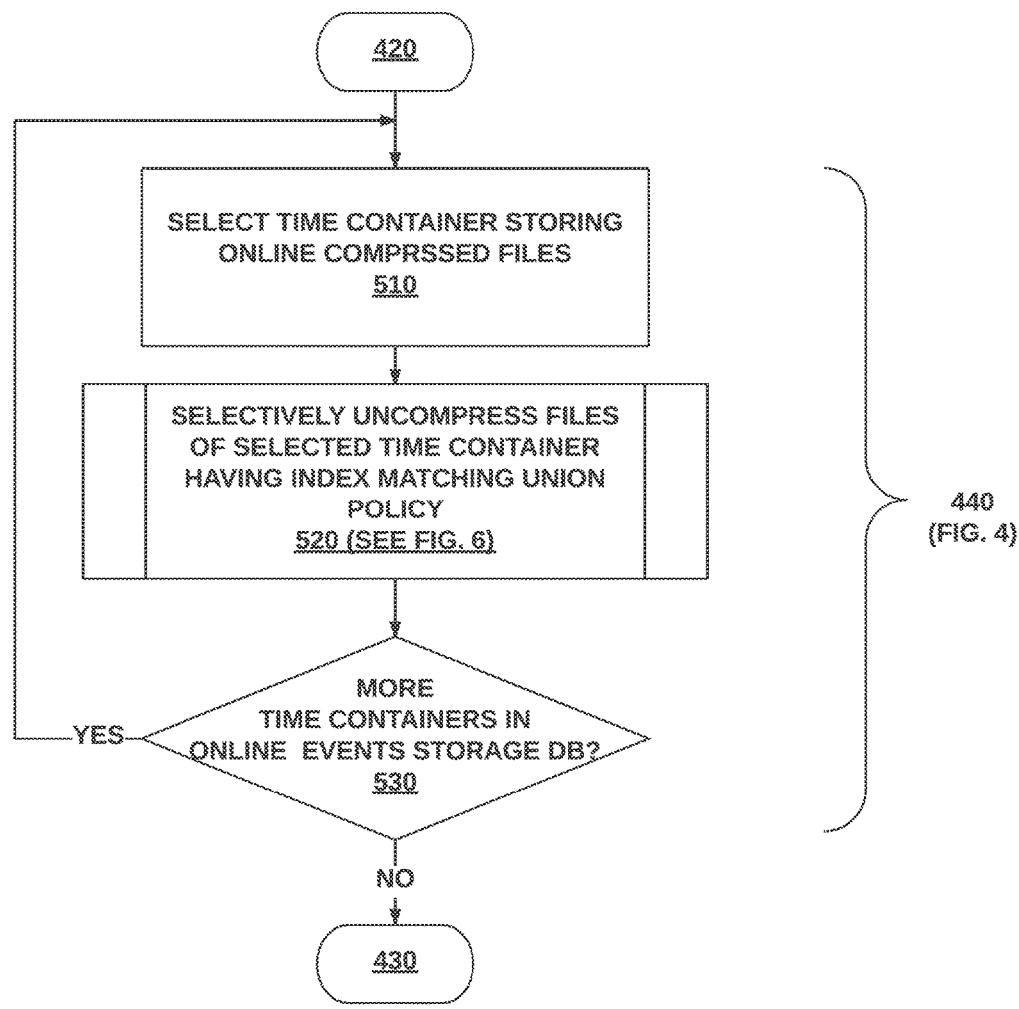
FIG. 5 is a more detailed flow diagram illustrating a step of selectively purging event records from time containers based on multiple retention policies defining various retention durations, according to one embodiment.
Figure 6:
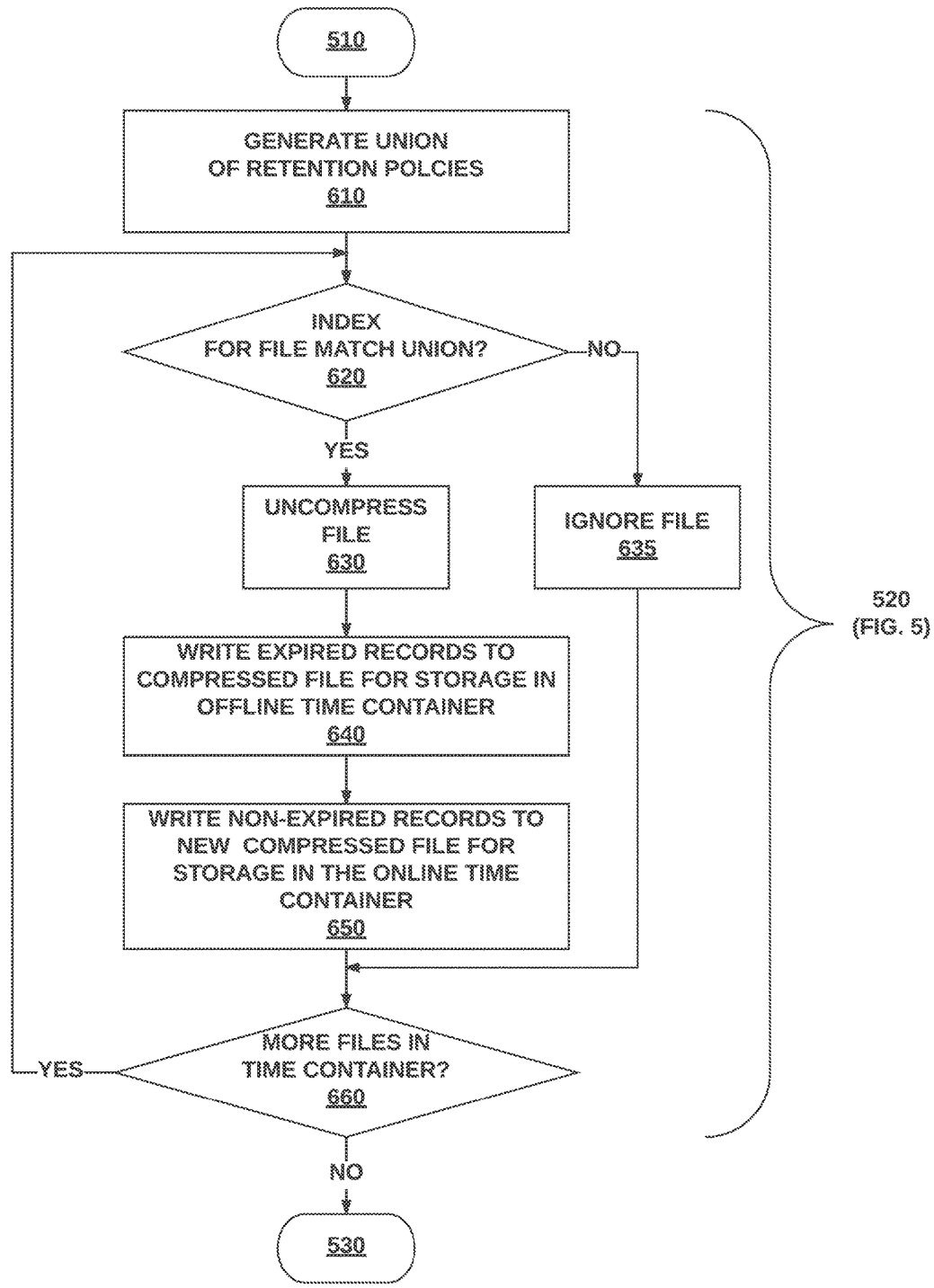
FIG. 6 is a more detailed flow diagram illustrating a step of selectively uncompressing files having an index matching a union policy from the method of FIG. 5, according to one embodiment.

Methods for Enforcing Data Retention Policies with Selective Purges (FIG. 4-6)

FIG. 4 is a high-level flow diagram illustrating a method 400 for enforcing data retention policies and servicing search queries for event records in a high volume log system with limited I/O bandwidth, according to one embodiment. The method 400 can be implemented by the system 100 of FIG. 1 or a different system. One of ordinary skill in the art will recognize that the method 400 is non-limiting as other embodiments can have more or less steps and can be performed in a different order.

Retention policies are received for different event types (step 410). Log event records are received from network components in time containers (step 420). Event records are selectively purged from time containers based on multiple retention polices defining various retention durations, while also servicing event record queries (step 430), as described further in FIG. 5. In other words, the I/O transactions support both queries and selective purging at the same time.

FIG. 5 is a more detailed flow diagram illustrating the step 430 of selectively purging event records from time containers based on multiple retention policies defining various retention durations, according to one embodiment.

A time container storing online compressed files is selected (step 510). In one embodiment, an index for each compressed file is checked for expiring compressed records (step 520), as described in FIG. 6. In this embodiment, the step 420 continues through each of the time containers (step 530).

FIG. 6 is a more detailed flow diagram illustrating a step 520 of selectively uncompressing files having an index matching a union policy from the method of FIG. 5, according to one embodiment.

A union of retention policies is generated (step 610). If a file index matches the union (step 620), the file is uncompressed (step 630), and if not, then the file is ignored (step 635). Expired files are written to a compressed file in a time container for offline storage (step 640). The expired event records only need to consume I/O bandwidth for purging once during an enforcement period. Unexpired files are written to new compressed file for storage in the online time container (step 650). In this embodiment, each of the files in a container are checked (step 660) or an index is searched for matches.

Generic Computing Device (FIG. 7)

FIG. 7 is a block diagram illustrating an exemplary computing device 700 for use in the system 100 of FIG. 1, according to one embodiment. The computing device 700 is an exemplary device that is implementable for each of the components of the system 100, including the log management server 110, the network component 120, and the querying device 130. The computing device 700 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 700, of the present embodiment, includes a memory 710, a processor 720, a storage drive 730, and an I/O port 740. Each of the components is coupled for electronic communication via a bus 799. Communication can be digital and/ or analog, and use any suitable protocol.

The memory 710 further comprises network applications 712 and an operating system 714. The network applications 712 can include the modules of the log management server 110, the network component 120, and the querying device 130, as illustrated in FIGS. 1-3. Other network applications 712 can include a web browser, a mobile application, an application that uses networking, a remote application executing locally, a network protocol application, a network management application, a network routing application, or the like.

The operating system 714 can be one of the Microsoft Windows® family of operating systems (e.g., Windows 95, 98, Me, Windows NT, Windows 2000, Windows XP, Windows XP x64 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 720 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 720 can be single core, multiple core, or include more than one processing elements. The processor 720 can be disposed on silicon or any other suitable material. The processor 720 can receive and execute instructions and data stored in the memory 710 or the storage drive 730

The storage drive 730 can be any non-volatile type of storage such as a magnetic disc, EEPROM (electronically erasable programmable read-only memory), Flash, or the like. The storage drive 730 stores code and data for applications.

The I/O port 740 further comprises a user interface 742 and a network interface 744. The user interface 742 can output to a display device and receive input from, for example, a keyboard. The network interface 744 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method for a log management server on a data communication network for enforcing data retention policies with selective data purges during an enforcement period, the method comprising:
   logging event records received from a plurality of network components in time containers, comprising:
      receiving a plurality of data retention policies for a plurality of data types, wherein each data retention policy describes a retention duration for enforcement of a data type with respect to online retention and offline retention,
      storing online compressed files containing a plurality of event records occurring during a time period in a time container, and
      generating an index layer for each event record in the compressed files based on a data retention policy associated with a data type of the event, the data retention policy comprising an online retention duration definition; and
   selectively purging logged event records from the time containers, comprising:
      relative to a current time and a specific data retention policy, identifying an online compressed file from a period of time potentially containing event records with an expiring retention duration,
      comparing an index file associated with the identified online compressed file to a retention duration of the specific data retention policy, and
      responsive to an event record in the identified online compressed file matching the retention duration of the specific data retention policy:
         uncompressing the identified online compressed file,
         writing expired event records in an offline compressed file for during a period of time in a time container, along with an index layer generated for the offline compressed file for each period of time based on a definition of the specific data retention policy for offline retention,
         writing non-expired event records in a new online compressed file, along with an index layer generated for the new online compressed file for each period of time based on the definition of the specific data retention policy for online retention, and
         purging the original identified online compressed file.

2. The method of claim 1, wherein selectively purging logged event records from the time containers further comprises:
   responsive to no event record in the identified compressed file matching the retention duration of the data retention policy, refraining from uncompressing the specific compressed file.

3. The method of claim 1, wherein selectively purging logged event records from the time containers further comprises:
   relative to a current time and a specific data retention policy, identifying an offline compressed file from a period of time potentially containing event records with an expiring retention that ends policy enforcement,
   comparing an index file associated with the identified offline compressed file to a retention duration of the specific data retention policy, and
   responsive to an event record in the identified offline compressed file matching the retention duration of the specific data retention policy:
      uncompressing the specific offline compressed file,
      writing non-expired event records in a new offline compressed file, along with an index layer generated for the online compressed file for each period of time based on the definition of the specific retention policy for online retention, and
      purging the identified offline compressed file.

4. The method of claim 1, further comprising:
   receiving a query involving the logged event records wherein the query shares an I/O bandwidth of the log management server that is also used when selectively purging logged record events.

5. The method of claim 1, further comprising:
   scheduling a selective purge of logged event records the offline compressed file or the new online compressed file,
   wherein the scheduling is based on a union of data retention policies associated with the offline compressed file or the new online compressed file.

6. The method of claim 1, wherein each of the plurality of data retention policies comprise a filter selected from at least one of a parsed event attribute: a customer, a reporting device or group, an event type or group, a host (source or destination) device or group, a TCP/UDP port or range, a process/application name or group and a user or group/domain.

7. The method of claim 1, wherein each of the plurality of data policies definitions comprise an action selected from at least one of: online storage retention duration, and offline storage retention duration.

8. The method of claim 1, further comprising:
   marking the time container associated with the new online compressed file comprising non-expired event records as enforcement-in-progress.

9. The method of claim 1, further comprising:
marking the time container associated with the new offline compressed file comprising non-expired event records as enforcement-upcoming.

10. The method of claim 1, further comprising:
responsive to all event records of the specific compressed file being expired, marking the time container as enforcement-complete.

11. The method of claim 1, wherein an event record for a specific network component comprises at least one of: a performance or health metric, a traffic flow statistic, an access or authentication, and a configuration change.

12. The method of claim 1, wherein at least two of the plurality of access points implementing the rules are manufactured by different vendors and have distinct operating systems.

13. A non-transitory computer-readable medium to, when executed by a processor, perform a computer-implemented method in a log management server on a data communication network for enforcing data retention policies with selective data purges during an enforcement period, the method comprising:
logging event records received from a plurality of network components in time containers, comprising:
receiving a plurality of data retention policies for a plurality of data types, wherein each data retention policy describes a retention duration for enforcement of a data type with respect to online retention and offline retention,
storing online compressed files containing a plurality of event records occurring during a time period in a time container, and
generating an index layer for each event record in the compressed files based on a data retention policy associated with a data type of the event, the data retention policy comprising an online retention duration definition; and
selectively purging logged event records from the time containers, comprising:
relative to a current time and a specific data retention policy, identifying an online compressed file from a period of time potentially containing event records with an expiring retention duration,
comparing an index file associated with the identified online compressed file to a retention duration of the specific data retention policy, and
responsive to an event record in the identified online compressed file matching the retention duration of the specific data retention policy:
uncompressing the identified online compressed file,
writing expired event records in an offline compressed file for during a period of time in a time container, along with an index layer generated for the offline compressed file for each period of time based on a definition of the specific data retention policy for offline retention,
writing non-expired event records in a new online compressed file, along with an index layer generated for the new online compressed file for each period of time based on the definition of the specific data retention policy for online retention, and
purging the original identified online compressed file.

* * * * *